United States Patent
Mu

(10) Patent No.: US 9,644,500 B2
(45) Date of Patent: May 9, 2017

(54) ELECTRICITY-WATER CO-GENERATION SYSTEM AND METHOD

(71) Applicant: Datong Mu, Beijing (CN)

(72) Inventor: Datong Mu, Beijing (CN)

( * ) Notice: Subject to any disclaimer, the term of this patent is extended or adjusted under 35 U.S.C. 154(b) by 0 days.

(21) Appl. No.: 15/039,866

(22) PCT Filed: Jan. 8, 2015

(86) PCT No.: PCT/CN2015/070330
§ 371 (c)(1),
(2) Date: May 27, 2016

(87) PCT Pub. No.: WO2015/109948
PCT Pub. Date: Jul. 30, 2015

(65) Prior Publication Data
US 2016/0376933 A1   Dec. 29, 2016

(30) Foreign Application Priority Data
Jan. 22, 2014 (CN) .......................... 2014 1 0031259

(51) Int. Cl.
*F01K 23/04* (2006.01)
*F01K 11/02* (2006.01)
(Continued)

(52) U.S. Cl.
CPC ............ *F01K 23/04* (2013.01); *B01D 1/0058* (2013.01); *C02F 1/001* (2013.01); *C02F 1/16* (2013.01);
(Continued)

(58) Field of Classification Search
CPC .......... F01K 23/04; F01K 11/02; F01K 25/06; F01K 17/06; C02F 1/52; C02F 1/001;
(Continued)

(56) References Cited

U.S. PATENT DOCUMENTS 3,697,385 A * 10/1972 Tidball .................. B01D 3/065
                                                                202/173
4,083,781 A *  4/1978 Conger ................ B01D 61/022
                                                                210/651
(Continued)

FOREIGN PATENT DOCUMENTS

| CN | 101157486 A | 4/2008 |
| CN | 101956581 A | 1/2011 |
| CN | 103775150 A | 5/2014 |

OTHER PUBLICATIONS

International Search Report of PCT Patent Application No. PCT/CN2015/070330 issued on Apr. 8, 2015.

*Primary Examiner* — Hoang Nguyen

(57) ABSTRACT

An electricity-water co-generation system and method, the method comprising: step 1, heating saline water by spent steam, crystallizing a calcium magnesium compound in the saline water, then filtering the saline water; step 2, distilling the descaled water, and discharging strong saline water; step 3, converting the heat energy of the saturated steam into electric energy, dividing condensed water generated by releasing heat energy of the saturated steam into two parts, one part being output as fresh water; step 4, heating the other part of condensed water, and converting the heat energy of the overheated steam into electric energy, then feeding spent steam to heat the saline water and distilling the descaled water at a high temperature. The system comprises a descaling device, a mixed heat exchanger, a residual heat generator and a thermal power generation device, and the working process of the system is accordance with the method.

12 Claims, 3 Drawing Sheets

(51) Int. Cl.
*F01K 25/06* (2006.01)
*C02F 1/16* (2006.01)
*C02F 5/02* (2006.01)
*B01D 1/00* (2006.01)
*F01K 17/06* (2006.01)
*C02F 1/00* (2006.01)
*C02F 1/52* (2006.01)
*C02F 103/08* (2006.01)
*C02F 1/36* (2006.01)

(52) U.S. Cl.
CPC ............... *C02F 1/52* (2013.01); *C02F 5/025* (2013.01); *F01K 11/02* (2013.01); *F01K 17/06* (2013.01); *F01K 25/06* (2013.01); *C02F 1/36* (2013.01); *C02F 2001/5218* (2013.01); *C02F 2103/08* (2013.01); *C02F 2303/10* (2013.01); *Y02E 20/14* (2013.01)

(58) Field of Classification Search
CPC .... C02F 5/025; C02F 1/16; C02F 1/36; C02F 2303/10; C02F 2001/5218; C02F 2103/08; B01D 1/0058; Y02E 20/14
USPC .......................................... 60/648, 649, 673
See application file for complete search history.

(56) References Cited

U.S. PATENT DOCUMENTS

| | | | | |
|---|---|---|---|---|
| 4,141,825 A | * | 2/1979 | Conger | B01D 61/58 204/518 |
| 5,346,592 A | * | 9/1994 | Madani | B01D 1/26 159/46 |
| 7,749,386 B2 | * | 7/2010 | Voutchkov | B01D 61/022 210/102 |
| 2011/0198285 A1 | * | 8/2011 | Wallace | C01B 7/03 210/638 |
| 2012/0160753 A1 | * | 6/2012 | Vora | B01D 61/022 210/175 |

* cited by examiner

ELECTRICITY-WATER CO-GENERATION SYSTEM AND METHOD

BACKGROUND OF THE INVENTION

Technical Field

The present invention relates to thermal power generation technologies and saline water desalination technologies, in particular to an electricity-water co-generation system and method.

Description of Related Art

As shown in FIG. 1, in the current thermal power generation technology, fuel is burning in a boiler to heat water into overheat steam; the overheat steam drives a steam turbine to drive a generator to generate electricity; the overheat steam releases potential energy to do work, and changes into spent steam; the spent steam is delivered to a condenser to release heat energy and then generates condensed water; the condensed water is heated by a low voltage heater, deaerated by a deaerator, heated by a high voltage heater and then delivered to the boiler, and re-heated by the boiler into the overheatsteam for doing working, thus forming steam-water circulation to generate electricity continuously. In this process, about 40% of the chemical energy of the fuel can be converted into the electric energy; about 9% changes into production consumption; about 6% is the loss of the smoke exhausting heat of the boiler; about 45% is the cold-end heat loss generated by the heat energy through which the condenser discharges the spent steam to the environment. Those heat losses cause huge heat waste. Besides, in this process, it is needed to continuously supplement boiler supply water that is manufactured by chemical desalting to the deaerator, so the cost is high and equipment is complicated.

Existing saline water desalination technologies mainly include distillation methods, electrodialysis process and reverse osmosis process. Those methods are disadvantaged in large energy consumption and high cost. Besides, among the distillation methods, in order to prevent the equipment from scaling, high-temperature distillation method cannot be used, so only low-temperature distillation methods such as low-temperature multiple-effect method and multi-level flash method can be used, which has low water generation efficiency.

Therefore, the present invention provides an electricity-water co-generation system and method to solve problems existing in the thermal power generation and saline water desalination.

BRIEF SUMMARY OF THE INVENTION

The technical problem to be solved in the present invention is to provide an electricity-water co-generation system and method to improve the efficiency of thermal power generation and saline water desalination.

The present invention adopts the following technical solutions to solve above technical problems.

An electricity-water co-generation system includes a descaling device, a mixed heat exchanger, a residual heat generator and a thermal power generation device;

the descaling device is used for heating saline water through spent steam, rapidly crystallizing a calcium magnesium compound in the saline water as calcium-magnesium scale, filtering the saline water to obtain descaled water, delivering the descaled water to the mixed heat exchanger, and removing the calcium-magnesium scale;

the mixed heat exchanger is used for distilling the descaled water at a high temperature through the spent steam, generating saturated steam and strong saline water, delivering the saturated steam to the residual heat exchanger and discharging the strong saline water;

the residual heat exchanger is used for converting the heat energy of the saturated steam into electric energy, and separating the condensed water generated after the saturated steam releases the heat energy into two parts, one part being delivered to the thermal power generation device and the other part being output as fresh water; and, the thermal power generation device is used for heating the condensed water to generate overheat steam, converting the heat energy of the overheat steam into the electric energy, and feeding the spent steam generated by releasing the heat energy of the overheated steam to the descaling device and the mixed heat exchanger, respectively.

The system above has the beneficial effects of improving the efficiency of saline water desalination and reducing the energy consumption and cost of saline water desalination through descaling and distilling at a high temperature, and improving the thermal efficiency of the thermal power generation and lowering in the water consumption, energy consumption and cost of thermal power generation through power generation by using residual heat.

Based on the above technical solution, the electricity-water co-generation system can be improved in the following way.

Further, the descaling device is a pressure container that mixes the spent steam and saline water, performs heat transfer and mass transfer, raises the temperature of the saline water to 120° C. or above, and quickly crystallizes the calcium magnesium compound in the saline water as calcium-magnesium scale.

The above improved technical solution has the beneficial effect of avoiding scaling in the subsequent high-temperature distillation through descaling at a high temperature.

Further, the descaling device removes the calcium-magnesium scale by using the ultrasonic method, carbon dioxide snow jet spray method, high pressure water jet method, mechanical method and/or chemical method.

The above improved solution has the beneficial effect of ensuring the normal operation of the descaling device.

Further, the mixed heat exchanger mixes the spent steam and descaled water, performs heat transfer and mass transfer, and then distills the descaled water at a high temperature.

The above improved solution has the beneficial effect that mixed heat exchange and high-temperature distillation improves the desalination efficiency of saline water.

Further, the process that the residual heat generator converts the heat energy of the saturated steam into electric energy is specifically as follows. The residual heat generator has refrigerating fluid or low-melting-point metal; the refrigerating fluid or low-melting-point metal absorbs the heat energy of the saturated steam to expand, volatilize and/or boil to generate potential energy, and then the residual heat generator converts the potential energy of the residual heat generator into mechanical energy first and then converts the mechanical energy into electric energy.

The above improved solution has the following beneficial effect: in accordance with the existing technology of converting the heat energy into mechanical energy (refer to U.S. Pat. No. 2,402,463), the heat energy of the spent steam is efficiently converted into mechanical energy and then electric energy, realizing efficient power generation by using residual heat.

Further, the electricity-water co-generation system is also provided with a condenser for generating condensed water after releasing the heat energy of the saturated steam.

The above improved solution has the following beneficial effect: the condenser in the thermal power generation device converts the saturated steam into the condensed water, so the cost is low and the efficiency is high.

Further, the saline water includes seawater, bitter salt water, brackish water, poor quality water, industrial wastewater and/or domestic wastewater.

Further, the descaling device is a pressure reactor; the mixed heat exchanger is a cooling tower, a gas washing tower/sprinkling chamber, a jet type heat exchanger or a mixed condenser; the thermal power generation device includes a low voltage heater, a deaerator, a high-pressure heater, a boiler, a steam turbine and a generator. A thermal power generation device frequently used in this field can be used. FIG. 1 shows the structure of a thermal power generation device.

Further, fresh water generated by the electricity-water co-generation system can be used as the supplemental water of the boiler of the thermal power generation device.

The above improved solution has the following beneficial effect: compared with chemical methods of manufacturing the supplemental water of the boiler, the cost is lower and the water quality is better.

Corresponding to the electricity-water co-generation system, the technical solution of the present invention also provides an electricity-water co-generation method, including the following steps:

step 1, heating saline water by spent steam, rapidly crystallizing a calcium magnesium compound in the saline water as calcium magnesium scale, then filtering the saline water to obtain descaled water and removing the calcium-magnesium scale;

step 2, distilling the descaled water by the spent steam at a high temperature to generate saturated steam and strong saline water, and discharging the strong saline water;

step 3, converting the heat energy of the saturated steam into electric energy, then dividing condensed water generated by releasing heat energy of the saturated steam into two parts, one part being output as fresh water, while the other part being delivered to the thermal power generation device; and, step 4, heating the other part of condensed water to generate overheated steam, and converting the heat energy of the overheated steam into electric energy, then feeding spent steam generated by releasing the heat energy of the overheated steam to heat the saline water in step 1 and distill the descaled water at a high temperature in step 2, by the thermal power generation device.

The method has the beneficial effects of: improving the efficiency of saline water desalination and reducing the energy consumption and cost of saline water desalination through descaling and distilling at a high temperature, and improving the thermal efficiency of the thermal power generation and lowering in the water consumption, energy consumption and cost of thermal power generation through power generation by using residual heat.

Based on the above technical solution, the electricity-water co-generation method can be improved in the following way.

Further, in step 1, a pressure container is used to mix the spent steam and saline water, performs heat transfer and mass transfer, raises the temperature of the saline water to 120° C. or above, and quickly crystallizes the calcium magnesium compound in the saline water as calcium-magnesium scale.

The above improved technical solution has the beneficial effect of avoiding scaling in the subsequent high-temperature distillation through descaling at a high temperature.

Further, in step 1, the calcium-magnesium scale is removed by using the ultrasonic method, carbon dioxide snow jet spray method, high pressure water jet method, mechanical method and/or chemical method.

The above improved solution has the beneficial effect of ensuring the normal operation of the descaling device.

Further, in step 2, the mixed heat exchanger is used to mix the spent steam and descaling water, performs heat transfer and mass transfer, and then carries out distillation at a high temperature to remove the scales.

The above improved solution has the beneficial effect that mixed heat exchange and high-temperature distillation improves the desalination efficiency of saline water.

Further, in step 3, the process of converting the heat energy of the saturated steam into electric energy is specifically as follows. Refrigerating fluid or low-melting-point metal is used to absorb the heat energy of the saturated steam to expand, volatilize and/or boil to generate potential energy, and then the potential energy of the residual heat generator is converted into mechanical energy first and then the mechanical energy is converted into electric energy.

The above improved solution has the following beneficial effect: In accordance with the existing technology of converting the heat energy into mechanical energy (refer to U.S. Pat. No. 2,402,463), the heat energy of the spent steam is efficiently converted into mechanical energy and then electric energy, realizing efficient power generation by using residual heat.

Further, in accordance with the electricity-water co-generation method, a condenser is also provided for generating condensed water after releasing the heat energy of the saturated steam.

The above improved solution has the following beneficial effect: the condenser in the thermal power generation device converts the saturated steam into the condensed water, so the cost is low and the efficiency is high.

Further, in accordance with the electricity-water co-generation method, heat network backwater can be used to replace the saline water, and a part of the obtained descaled water is output as supply water of the heat network.

The above improved solution has the beneficial effect of ensuring the electricity-heat co-production with a low cost and a high efficiency.

Further, in accordance with the electricity-water co-generation method, industrial residual heat or air heated by electricity at a valley load can be used to replace the spent steam.

The above improved solution has the beneficial effect that: The system and the method provided by the present invention realize electricity-water co-production with a low cost and a high efficiency.

DESCRIPTION OF THE MARKS IN THE ATTACHED DRAWINGS

10. Descaling device; 20. mixed heat exchanger; 30. residual heat generator; 40. thermal power generation device; 401. low voltage heater; 402. deaerator; 403. high voltage heater; 404. boiler; 405. steam turbine; 406. generator.

DETAILED DESCRIPTION OF THE INVENTION

The principle and characteristics of the present invention are described with reference to the attached drawings. Embodiments here are used for explaining the present invention, not limiting the scope of the present invention.

Embodiment 1 provides an electricity-water co-generation system and an electricity-water co-generation method. The electricity-water co-generation method includes the following steps:

step 1, heating saline water by spent steam, rapidly crystallizing a calcium magnesium compound in the saline water as calcium magnesium scale, then filtering the saline water to obtain descaled water and removing the calcium-magnesium scale;

step 2, distilling the descaled water by the spent steam at a high temperature to generate saturated steam and strong saline water, and discharging the strong saline water;

step 3, converting the heat energy of the saturated steam into electric energy, dividing condensed water generated by releasing heat energy of the saturated steam into two parts, wherein one part is output as fresh water; and, step 4, heating the other part of condensed water to generate overheated steam, and converting the heat energy of the overheated steam into electric energy, then feeding spent steam generated by releasing the heat energy of the overheated steam to heat the saline water in step 1 and distill the descaled water at a high temperature in step 2.

Besides, in step 1, a pressure container is used to mix the spent steam and saline water, performs heat transfer and mass transfer to raise the temperature of the saline water 120° C. or above, so the calcium magnesium compound in the saline water is quickly crystallized as calcium-magnesium scale. In step 1, the calcium-magnesium scale is removed by using the ultrasonic method, carbon dioxide snow jet spray method, high pressure water jet method, mechanical method and/or chemical method. In step 2, the mixed heat exchanger is used to mix the spent steam and descaling water, performs heat transfer and mass transfer, and then carries out distillation at a high temperature to remove the scales. In step 3, the process of converting the heat energy of the saturated steam into electric energy is specifically as follows: refrigerating fluid or low-melting-point metal is used to absorb the heat energy of the saturated steam to expand, volatilize and/or boil to generate potential energy, and then the potential energy of the residual heat generator is converted into mechanical energy first and then the mechanical energy is converted into electric energy.

Figure 1:
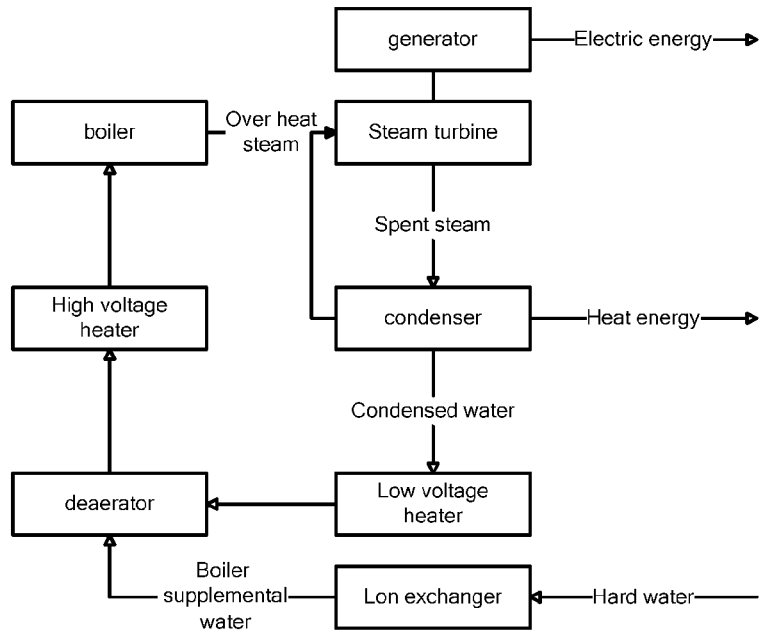
FIG. 1 is a structural view of existing thermal power generation technologies.
Figure 2:
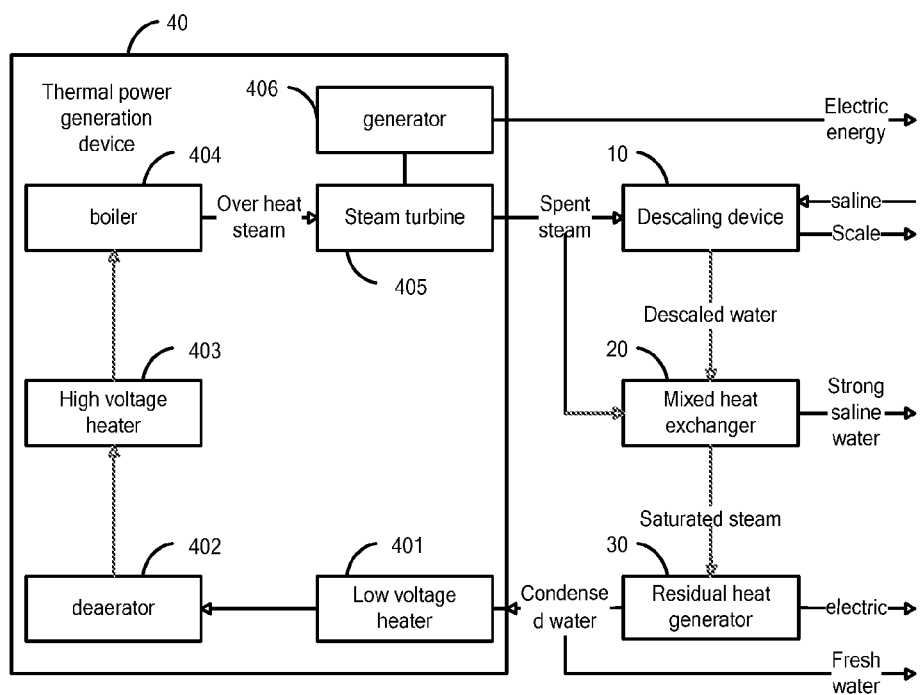
FIG. 2 is a structural view of an electricity-water co-generation system in Embodiment 1 of the present invention.

Correspondingly, as shown in FIG. 2, an electricity-water co-production system includes a descaling device 10, a mixed heat exchanger 20, a residual heat generator 30 and a thermal power generation device 40.

The descaling device 10 is used for mixing the spent steam and saline water, performing heat transfer and mass transfer to raise the temperature of the saline water to 120° C. or above, quickly crystallizing the calcium magnesium compound in the saline water as calcium-magnesium scale, then filtering the saline water to obtain descaled water, delivering the descaled water to the mixed heat exchanger 20, and removing calcium-magnesium scale by using the ultrasonic method, carbon dioxide snow jet spray method, high pressure water jet method, mechanical method and/or chemical method; the mixed heat exchanger 20 is used for mixing the spent steam and descaled water, performing heat transfer and mass transfer, then distilling the descaled water at a high temperature to generate saturated steam and strong saline water, delivering the saturated steam and strong saline water to the residual heat generator 30, and discharging the strong saline water.

The residual heat exchanger 30 has refrigerating fluid or low-melting-point metal, is used for generating potential energy after the refrigerating fluid or low-melting-point metal absorbs the heat energy of the saturated steam to expand, volatilize and/or boil, converting the heat energy of the saturated steam into mechanical energy first and then converting the mechanical energy into electric energy, and separating the condensed water generated after the saturated steam releases the heat energy into two parts, wherein one part is delivered to the low voltage heater 401 of the thermal power generation device 40 and the other part is output as fresh water.

The thermal power generation device 40 includes a low voltage heater 401, a deaerator 402, a high voltage heater 403, the boiler 404, a steam turbine 405 and a generator 406. The working process is follows. Fuel is burning in the boiler 404 to heat water into overheat steam; the overheat steam drives the steam turbine 405 to drive the generator 406 to generate electricity; the overheat steam releases the potential energy to do work, and changes into spent steam; the spent steam passes through the descaling device 10, the mixed heat exchanger 20 and the residual heater generator 30 to release the heat energy and then generates the condensed water; the condensed water is heated by the low voltage heater 401, deaerated by the deaerator 402, heated by the high voltage heater 403 and then delivered to the boiler 404, and re-heated by the boiler 404 into the overheat steam for doing working, thus forming steam-water circulation to generate electricity continuously.

Figure 3:
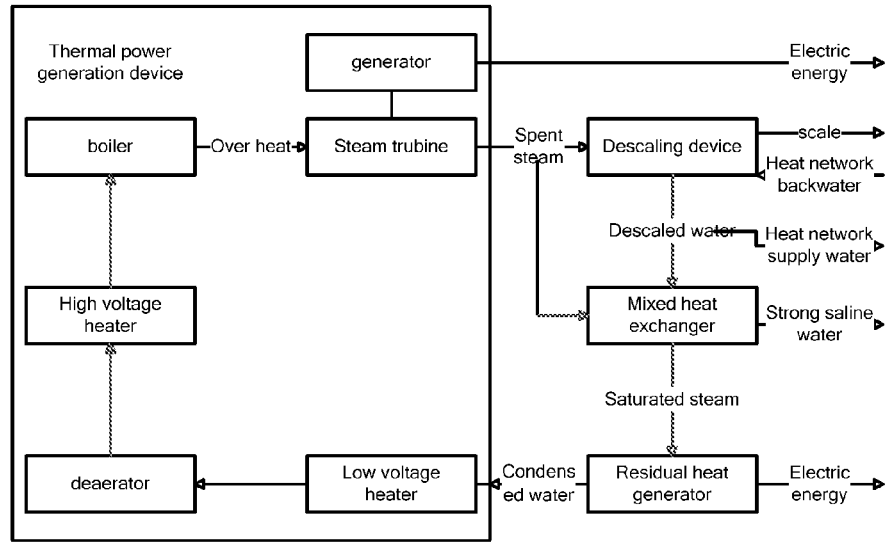
FIG. 3 is a structural view of a heat-electricity co-generation system in Embodiment 2 of the present invention.

As shown in FIG. 3, Embodiment 2 provides a heat-electricity co-generation system, including a descaling device, a mixed heat exchanger, a residual heat generator and a thermal power generation device, wherein the structures and functions of the mixed heat exchanger, the residual heater generator and the thermal power generation device are identical with those in Embodiment 1.

The descaling device is used for mixing the spent steam and the heat network backwater, performing heat transfer and mass transfer to raise the temperature of the heat network backwater to 120° C. or above, quickly crystallizing the calcium magnesium compound in the saline water as calcium-magnesium scale, then filtering the saline water to obtain descaled water, separating the descaled water into two parts, one part being output as the heat network supply water, and the other being delivered to the mixed heat exchanger, and removing the scale by using ultrasonic method, carbon dioxide snow jet spray method, high pressure water jet method, mechanical method and/or chemical method.

Figure 4:
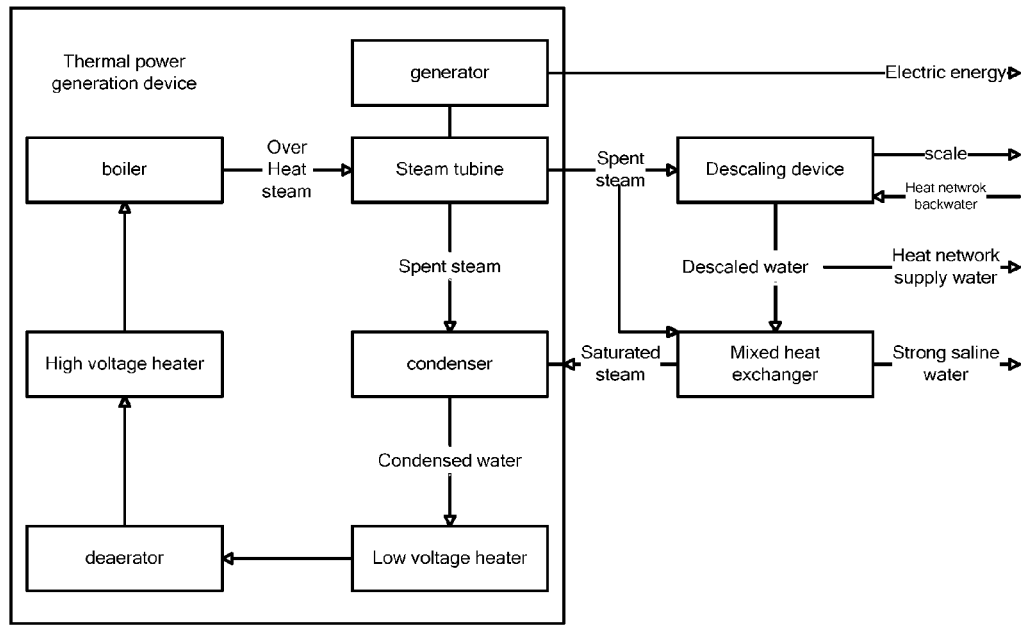
FIG. 4 is a structural view of a heat-electricity co-generation system in Embodiment 3 of the present invention.

As shown in FIG. 4, Embodiment 3 provides a heat-electricity co-generation system, including a descaling device, a mixed heat exchanger and a thermal power generation device, wherein the descaling device has a structure and functions identical with the structure and functions of the descaling device in Embodiment 2, and the mixed heat exchanger has functions identical with the functions of the mixed heat exchanger in Embodiment 2, but delivers the saturated steam to the condenser of the thermal power generation device.

The thermal power generation device includes a low voltage heater, a deaerator, a high voltage heater, a boiler, a steam turbine, a generator and a condenser. Its working process is as follows. Fuel is burning in the boiler to heat water into overheat steam; the overheat steam drives the steam turbine to drive the generator to generate electricity; the overheat steam releases the potential energy to do work, and changes into spent steam; the spent steam is separated into two parts, wherein one part passes through the descaling device and the mixed heat exchanger to release the heat energy and then generates the saturated steam, while the other part is delivered to the condenser; the condenser mixes the spent steam and the saturated steam to release heat energy and then generates the condensed water; and the condensed water is delivered to the low voltage heater for generating electricity.

Figure 5:
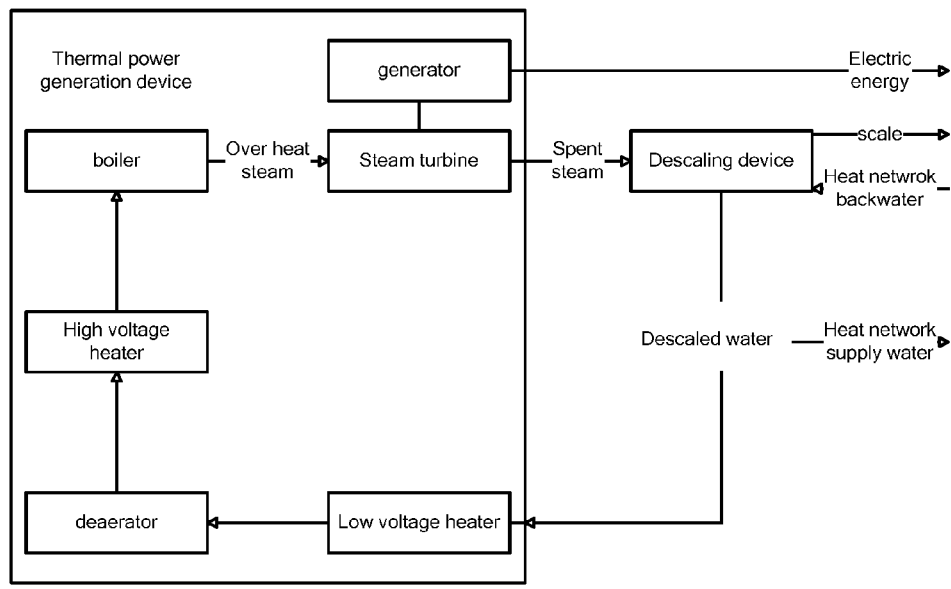
FIG. 5 is a structural view of a heat-electricity co-generation system in Embodiment 4 of the present invention.

As shown in FIG. 5, Embodiment 4 provides a heat-electricity co-generation system, including a descaling device and a thermal power generation device, wherein the descaling device has functions identical with the functions of the descaling device in Embodiment 2, but separates the descaled water into two parts, wherein one part is output as the heat network supply water, and the other part is delivered to the low voltage heater of the thermal power generation device; the thermal power generation device has functions also identical with the functions of the thermal power generation device in Embodiment 2, but the low voltage heater thereof uses the descaled water for generating electricity.

Figure 6:
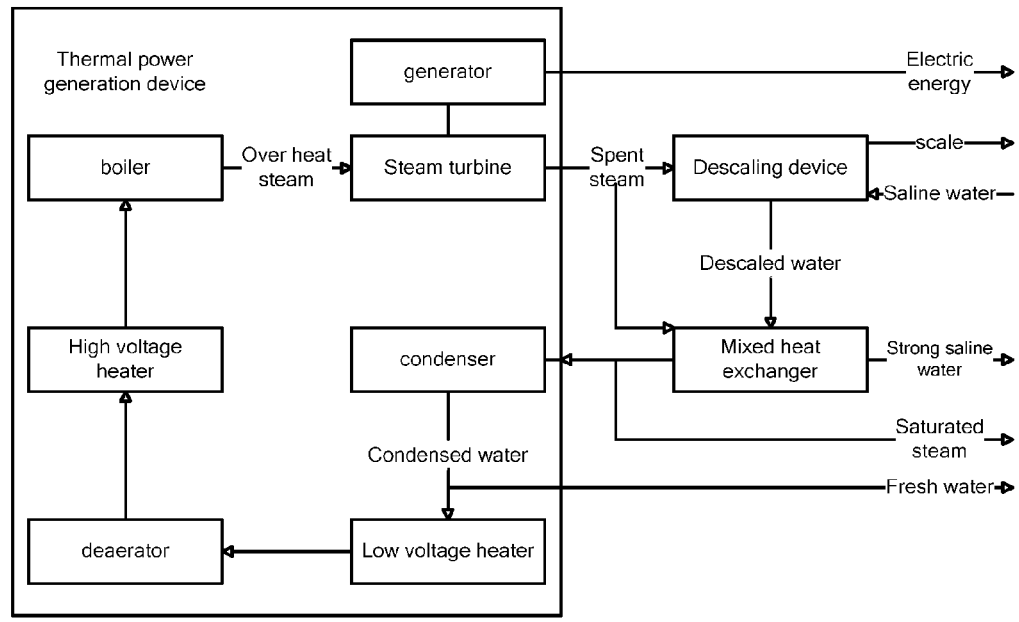
FIG. 6 is a structural view of a heat-electricity-water co-generation system in Embodiment 5 of the present invention.

As shown in FIG. 6, Embodiment 5 provides a heat-electricity-water co-generation system, including a descaling device, a mixed heat exchanger and a thermal power generation device, wherein the descaling device has functions identical with the functions of the descaling device in Embodiment 3, but uses the saline water as to replace the heat network backwater; the mixed heat exchanger has functions also identical with the functions of the thermal power generation device in Embodiment 3, but separates the saturated steam into two parts, wherein one part is delivered to the condenser of the thermal power generation device, and the other part is used for heating the heat network backwater; and the thermal power generation device has functions identical with the functions of the thermal power generation device in Embodiment 3, but outputs a part of the condensed water as fresh water.

Besides, when heat supply is not needed, the mixed heat exchanger delivers all generated saturated steam to the condenser for electricity-water co-production.

The above embodiments are only preferably embodiments of the present invention and shall not be regarded as limiting the present invention. Any modifications, equivalent changes and improvement made within the concept and principle of the present invention shall fall within the protective scope of the present invention.

What is claimed is:

1. An electricity-water co-generation system, comprising a descaling device, a mixed heat exchanger, a residual heat generator and a thermal power generation device;

the descaling device, used for heating saline water through spent steam, rapidly crystallizing a calcium magnesium compound in the saline water as calcium-magnesium scale, filtering the saline water to obtain descaled water, delivering the descaled water to the mixed heat exchanger, and removing the calcium-magnesium scale; the descaling device is a pressure container that mixes the spent steam and saline water, performs heat transfer and mass transfer, and then raises the temperature of the saline water to 120° C. or above, and quickly crystallizes the calcium magnesium compound in the saline water as calcium-magnesium scale, the mixed heat exchanger, used for distilling the descaled water at a high temperature through the spent steam, generating saturated steam and strong saline water, delivering the saturated steam to the residual heat exchanger and discharging the strong saline water;

the residual heat exchanger, used for converting the heat energy of the saturated steam into electric energy, and separating the condensed water generated after the saturated steam releases the heat energy into two parts, one part being delivered to the thermal power generation device and the other part being output as fresh water; and, the thermal power generation device, used for heating the condensed water to generate overheat steam, converting the heat energy of the overheat steam into the electric energy, and feeding the spent steam generated by releasing the heat energy of the overheated steam to the descaling device and the mixed heat exchanger, respectively.

2. The electricity-water co-generation system according to claim 1, characterized in that, the descaling device removes the calcium-magnesium scale by using ultrasonic method, carbon dioxide snow jet spray method, high pressure water jet method, mechanical method and/or chemical method.

3. The electricity-water co-generation system according to claim 1, characterized in that, characterized in that, the process that the residual heat generator converts the heat energy of the saturated steam into electric energy is specifically as follows: the residual heat generator has refrigerating fluid or low-melting-point metal, the refrigerating fluid or low-melting-point metal absorbs the heat energy of the saturated steam to expand, volatilize and/or boil to generate potential energy, and then the residual heat generator converts the potential energy of the residual heat generator into mechanical energy first and then converts the mechanical energy into electric energy.

4. The electricity-water co-generation system according to claim 1, characterized in that, the electricity-water co-generation system is also provided with a condenser for generating condensed water after releasing the heat energy of the saturated steam.

5. An electricity-water co-generation method, comprising the following steps:

step 1, heating saline water by spent steam, rapidly crystallizing a calcium magnesium compound in the saline water as calcium magnesium scale, then filtering the saline water to obtain descaled water and removing the calcium-magnesium scale; a pressure container is used to mix the spent steam and saline water, perform heat transfer and mass transfer, and then raise the temperature of the saline water to 120° C. or above, and quickly crystallize the calcium magnesium compound in the saline water as calcium-magnesium scale;

step 2, distilling the descaled water by the spent steam at a high temperature to generate saturated steam and strong saline water, and discharging the strong saline water;

step 3, converting the heat energy of the saturated steam into electric energy, then dividing condensed water generated by releasing heat energy of the saturated steam into two parts, one part being output as fresh water; and, step 4, heating the other part of condensed water to generate overheated steam, and converting the heat energy of the overheated steam into electric energy, then feeding spent steam generated by releasing the heat energy of the overheated steam to heat the saline water in step 1 and distill the descaled water at a high temperature in step 2, by the thermal power generation device.

6. The electricity-water co-generation method according to claim 5, characterized in that, in step 1, using ultrasonic method, carbon dioxide snow jet spray method, high pressure water jet method, mechanical method and/or chemical method.

7. The electricity-water co-generation method according to claim 5, characterized in that, in step 3, the process of converting the heat energy of the saturated steam into electric energy is specifically as follows: refrigerating fluid or low-melting-point metal is used to absorb the heat energy of the saturated steam to expand, volatilize and/or boil to generate potential energy, and then the heat energy of the residual heat generator is converted into mechanical energy first and then the mechanical energy is converted into electric energy.

8. The electricity-water co-generation method according to claim 5, characterized in that, in the electricity-water co-generation method, a condenser is also provided for generating condensed water after releasing the heat energy of the saturated steam.

9. The electricity-water co-generation method according to claim 5, characterized in that, in the electricity-water co-generation method, heat network backwater is used to replace the saline water, and a part of the obtained descaled water is output as supply water of the heat network.

10. The electricity-water co-generation method according to claim 6, characterized in that, in the electricity-water co-generation method, heat network backwater is used to replace the saline water, and a part of the obtained descaled water is output as supply water of the heat network.

11. The electricity-water co-generation method according to claim 7, characterized in that, in the electricity-water co-generation method, heat network backwater is used to replace the saline water, and a part of the obtained descaled water is output as supply water of the heat network.

12. The electricity-water co-generation method according to claim 8, characterized in that, in the electricity-water co-generation method, heat network backwater is used to replace the saline water, and a part of the obtained descaled water is output as supply water of the heat network.

* * * * *